(12) United States Patent
Cueff et al.

(10) Patent No.: US 6,522,703 B1
(45) Date of Patent: Feb. 18, 2003

(54) ESTIMATING FREQUENCY OFFSET TO DEMODULATE A PACKET OF PHASE-MODULATED SYMBOLS

(75) Inventors: Valérie Cueff, Paris (FR); Michel Terre, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/363,840

(22) Filed: Jul. 30, 1999

(30) Foreign Application Priority Data

Aug. 6, 1998 (FR) .............................. 98 10133

(51) Int. Cl.$^7$ .............................. H04L 27/18
(52) U.S. Cl. ........................ 375/329; 375/342; 375/362; 329/307
(58) Field of Search ................ 375/329, 341, 375/342, 344, 362, 365, 371, 373, 375; 370/503, 509, 510, 513, 516, 518; 329/307, 306, 313, 346

(56) References Cited

U.S. PATENT DOCUMENTS

| | | | |
|---|---|---|---|
| 5,376,894 A | * 12/1994 | Petranovich | 329/306 |
| 5,428,647 A | * 6/1995 | Rasky et al. | 370/350 |
| 5,463,627 A | * 10/1995 | Matsuoka et al. | 370/350 |
| 6,038,267 A | * 3/2000 | Oura et al. | 329/304 |
| 6,104,767 A | * 8/2000 | Atarius et al. | 375/344 |

FOREIGN PATENT DOCUMENTS

| | | |
|---|---|---|
| EP | 0 380 876 A3 | 8/1990 |
| EP | 0 533 208 A2 | 3/1993 |
| EP | 0 606 163 A2 | 7/1994 |
| EP | 0 851 640 A2 | 7/1998 |
| WO | WO 93/11605 | 6/1993 |

OTHER PUBLICATIONS

Thorpe, McLane: "A Hybrid Phase/Data Viterbi Demodulator for Encoded CPFSK Modulation", IEEE Global Telecommunications Conference, Nov. 28, 1983—Dec. 1, 1983, pp. 754–758 XP002097468.

* cited by examiner

Primary Examiner—Chi Pham
Assistant Examiner—Khanh Tran
(74) Attorney, Agent, or Firm—Sughrue Mion, PLLC

(57) ABSTRACT

The invention relates to a method of estimating the frequency offset of a packet of phase modulated symbols received with phase error, the method comprising:

applying a phase correction to the symbols of the received packet for all possible pairs of frequency offset and phase offset; and selecting from said offset pairs, the pair which provides the most likely packet of corrected symbols, thereby determining the frequency offset of the received packet.

Compared with known solutions, the invention makes it possible to reduce errors concerning estimated frequency. Advantageously, the method comprises a step of quantizing the possible phase corrections, thereby making it possible to reduce the complexity of the calculations to be performed, without degrading performance.

10 Claims, 3 Drawing Sheets

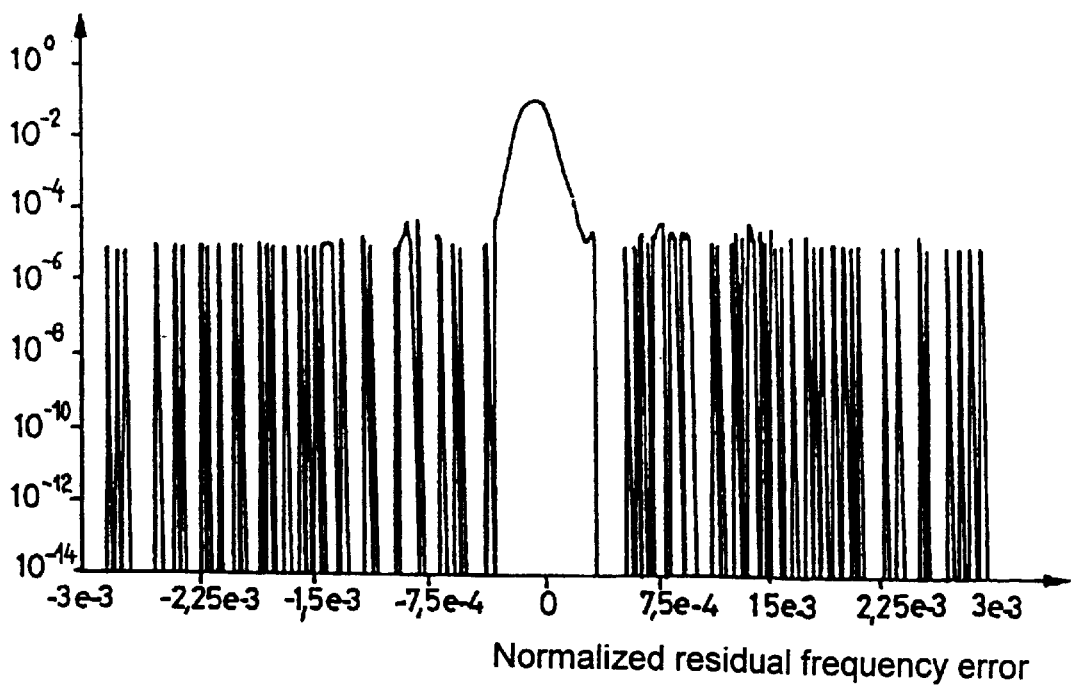
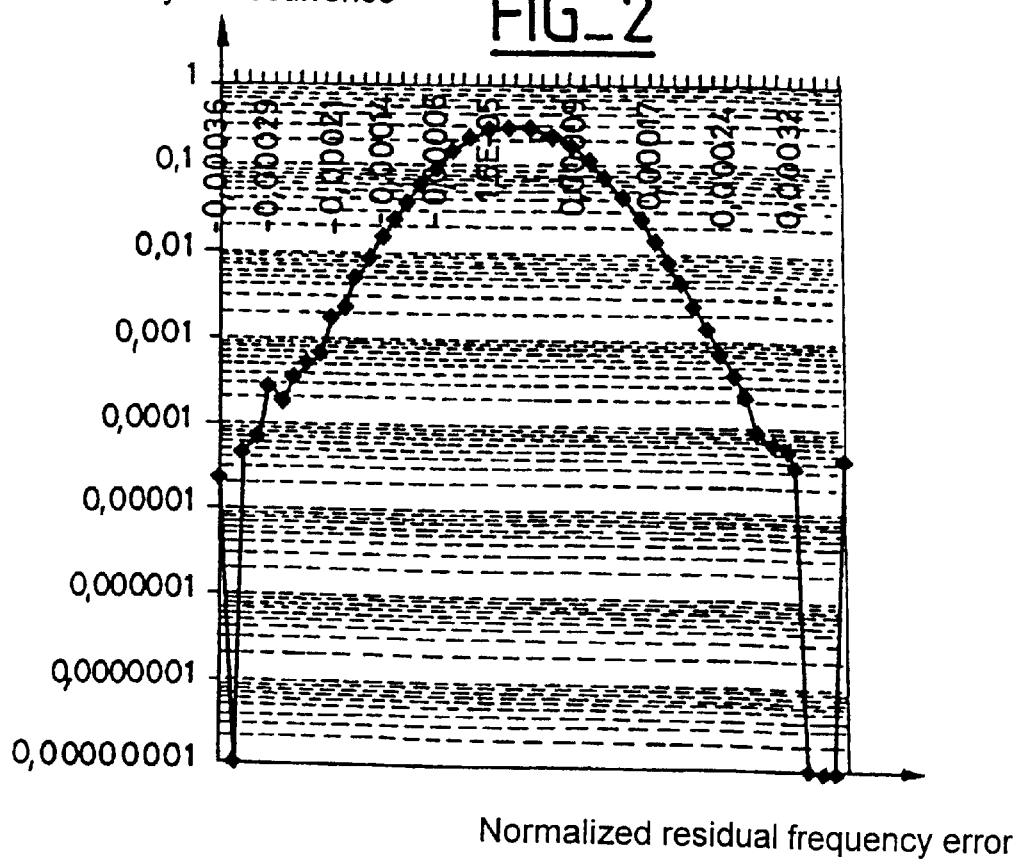

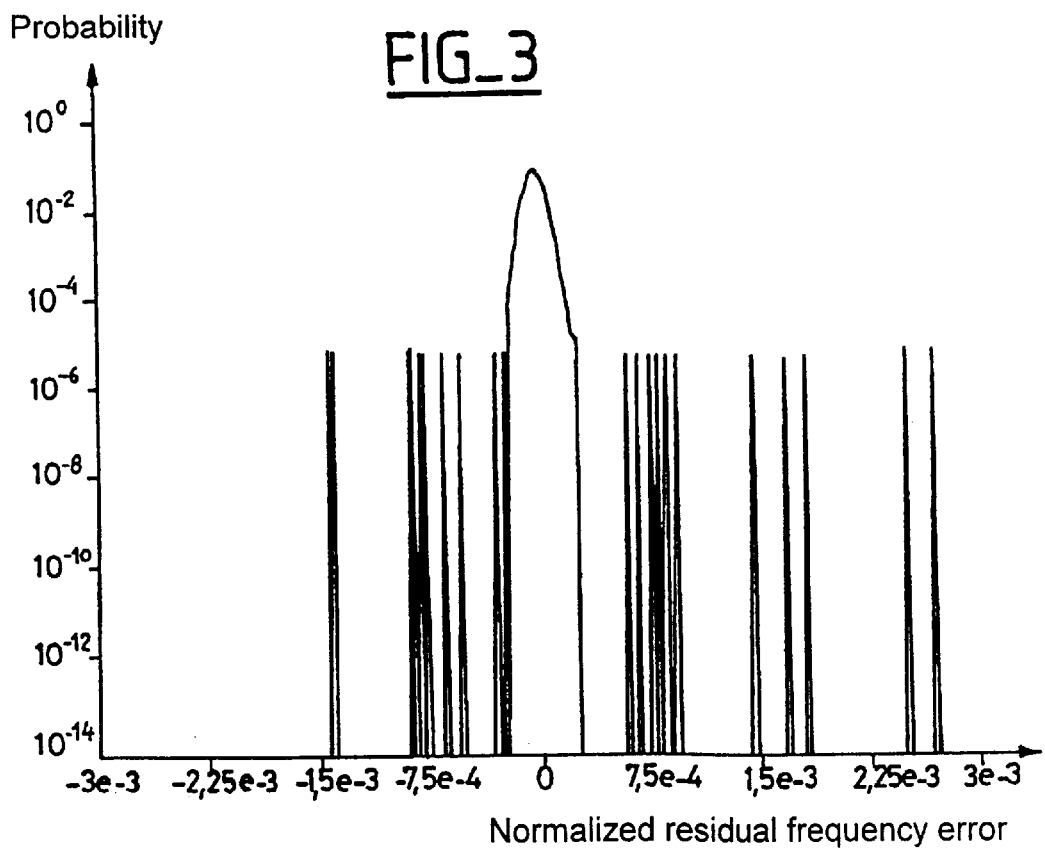
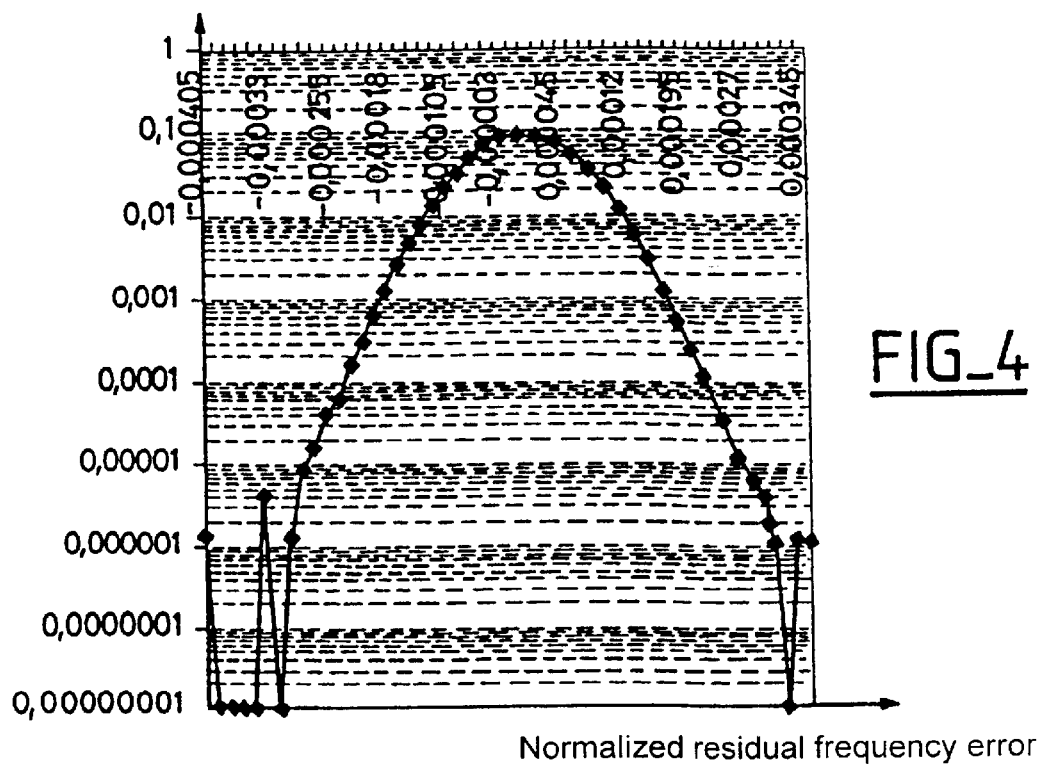

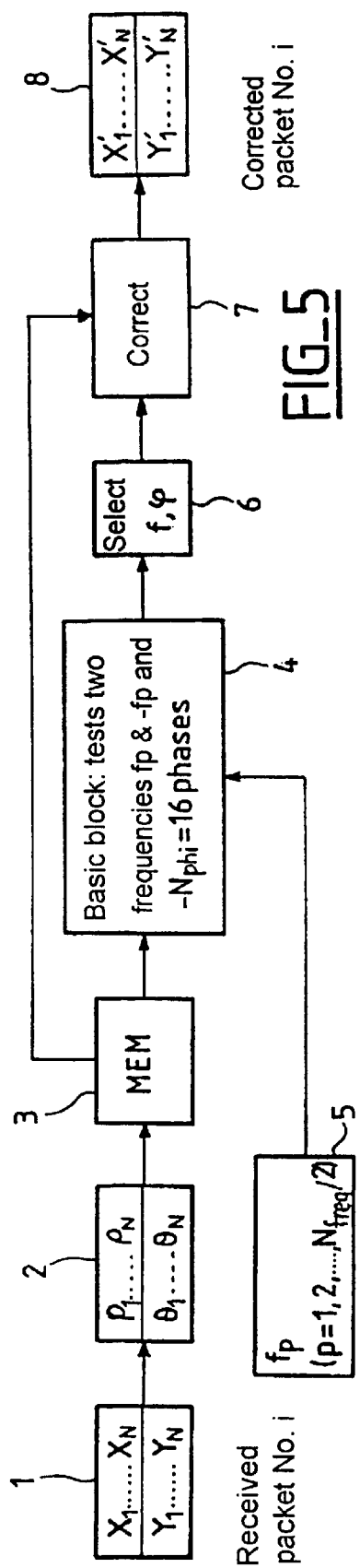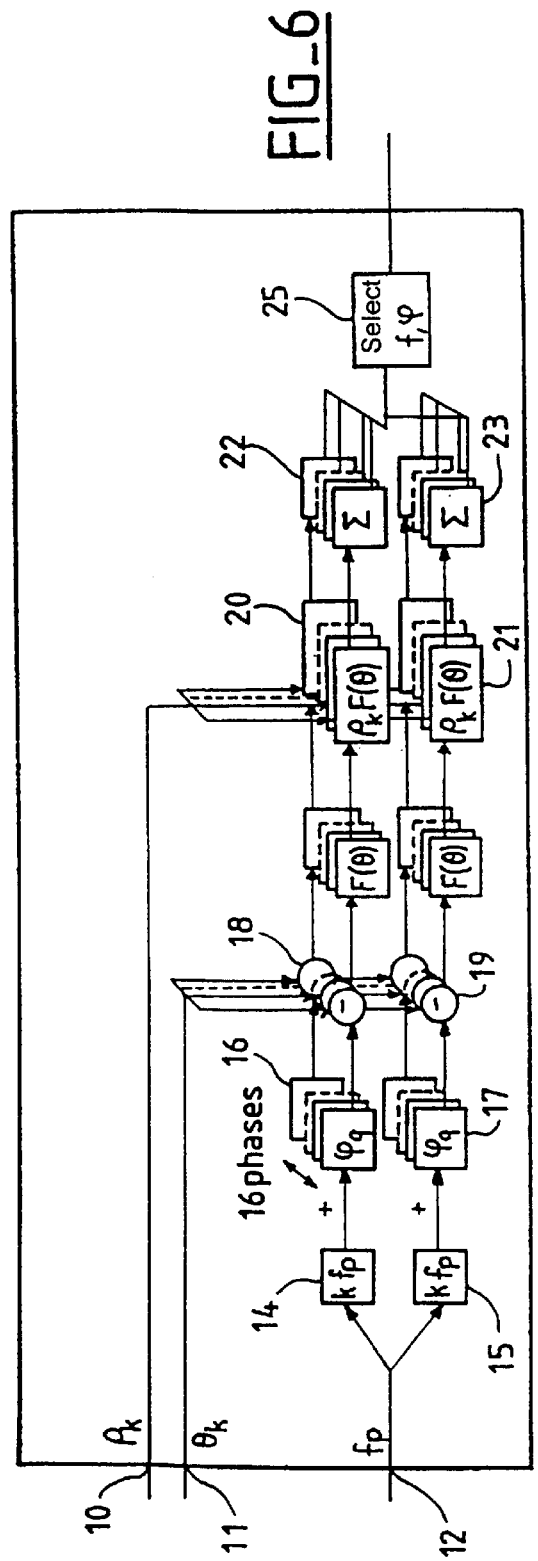

ESTIMATING FREQUENCY OFFSET TO DEMODULATE A PACKET OF PHASE-MODULATED SYMBOLS

FIELD OF THE INVENTION

The present invention relates to a method of estimating the frequency offset of a packet of phase-modulated symbols that have been received with phase error.

The invention relates to demodulating signals that have been modulated by phase shift keying (PSK), and more particularly to estimating the frequency and phase offsets that are necessary for demodulating signals in packet form that have been modulated by phase modulation, or by phase-and-amplitude modulation. The invention applies to the field of transmission, for the purpose of demodulating digital signals transmitted in the form of packets. A typical digital transmission channel comprises a binary source, an encoder, a modulator which transmits into the channel, a demodulator at the outlet from the channel, and a decoder which delivers the binary signal. Channel encoding is used to reduce the power needed to achieve a given bit error rate. Modulation and demodulation enable transmission to be performed over the selected channel. Insofar as the invention relates to demodulation, the other elements of the transmission system, such as source encoding and decoding are not described in greater detail.

BACKGROUND OF THE INVENTION

M. Morelli and U. Mengali, "Feedforward frequency estimation for PSK: a tutorial review", ETT Vol. 9, No. 2, March–April 1998, contains a description of the problem of synchronization in demodulators for digital transmission systems using phase modulation in packet mode. That document also describes the known solutions to the problem.

The problem of demodulating phase modulated digital signals that have been transmitted in packet mode arises particularly in satellite transmission systems using time division multiple access (TDMA), or for land cellular telecommunications systems. This is a major technical problem in the field of telecommunications.

OBJECTS AND SUMMARY OF THE INVENTION

More precisely, the invention provides a method of estimating the frequency offset of a packet of phase-modulated symbols that has been received with phase error, the method comprising:

applying a phase correction to the symbols of the received packet for all possible pairs of frequency offset and phase offset; and selecting from said offset pairs, the pair which provides the most likely packet of corrected symbols, thereby determining the frequency offset of the received packet.

In an implementation, the method further includes a step of quantizing possible phase corrections.

Preferably, the selection step comprises:

calculating a metric between the packet of symbols as received and phase-corrected and an estimate of the packet of symbols as sent; and seeking a minimum value of said metric.

In another implementation, the packet of symbols sent is estimated:

for known symbols, by using the transmitted symbol; and for unknown symbols, by taking a firm decision.

Advantageously, rotation through $e^{j2\pi/k}$, where k is a natural integer, leaves the set of possible symbols invariant, and possible phase values are selected from a range of [0, $2\pi/k$].

In another implementation, the phase correction applied to the symbols, for a frequency offset value $f_m$ and for a phase offset value $\phi_k$ is written $e^{-j(2\pi f_m(p-1)T_s + \phi_k)}$, where p is the position of the symbol and $T_s$ is the symbol time.

In this case, the values of the argument $-(2\pi f_m(p-1)T_s + \phi_k)$ are preferably calculated in the form of reduced values, e.g. over a range [0, $2\pi$].

The method can further comprise a prior step of calculating and storing all possible phase corrections to be applied to a symbol.

The method can further comprise a step of estimating the phase offset as being the phase offset value in said pair that provides the most likely packet of corrected symbols.

BRIEF DESCRIPTION OF THE DRAWINGS

Other characteristics and advantages of the invention will appear on reading the following description of implementations of the invention, given by way of example and with reference to the accompanying drawings, in which:

FIG. 1 is a histogram of normalized residual frequency error in a prior art estimator;

FIG. 2 is a histogram of normalized residual frequency error in an estimator of the invention;

FIG. 3 is a histogram analogous to FIG. 1, for another value of signal-to-noise ratio;

FIG. 4 is a histogram analogous to FIG. 2 for another value of signal-to-noise ratio;

FIG. 5 is a block diagram of apparatus for implementing the invention; and

FIG. 6 shows an embodiment of the basic block of FIG. 5.

MORE DETAILED DESCRIPTION

To determine the frequency offset, and where appropriate the phase offset, of a signal that is received in the form of a packet over a transmission channel, the invention proposes testing various possible pairs of phase offset and frequency offset, and then retaining the pair that is the most probable in the sense of a maximum likelihood criterion. This makes it possible to determine a value for frequency offset. In the description below, the invention is described with reference to quaternary phase shift keying (QPSK) by way of example. However the invention also applies to other types of modulation, for example PSK on some number of symbols other than four, or indeed phase-and-amplitude modulation of the QAM type, etc.

The invention applies to packets that present some known symbols, and also to packets that present no known symbols. N is used below to designate the number of symbols in a packet, $N_c$ the number of known symbols, where $0 \leq N_c \leq N$, and $N_i$ the number of information symbols where $N_i = N - N_c$.

The invention thus proposes testing possible frequency offset values and possible phase offset values. Possible frequency offset values are determined between a minimum value fmin and a maximum value fmax, with for example fmin=−fmax. It is then possible merely to test all possible frequency offset values between those two values at a pitch δf that is selected as a function of the desired performance. For each frequency value, various values of phase φ are also tested over the range 0 to $2\pi$, or over a smaller range, as explained below. All possible values can then be tested again at a pitch of δφ.

For $n_f$ possible frequency offset values and $n_\phi$ possible phase values, it is thus possible to test $n_f \times n_\phi$ pairs (assuming that all possible pairs are tested). The likelihood is calculated for each of the pairs tested, and on this basis the most likely frequency offset and phase offset pair is determined. Any appropriate metric can be selected as the likelihood criterion as a function of channel encoding; in the description below, an example is given in the absence of channel encoding, and likelihood is assessed by using Euclidian distances from ideal symbols in QPSK modulation.

In the example of a Euclidian metric and QPSK modulation, i.e. for a pair $(f_m, f_k)$ to be tested, the correction of the argument of the $p^{th}$ symbol in the packet, which symbol is written $s_p$, is written as follows:

$$-j(2\pi f_m(p-1)T_s + \phi_k)$$

with $j^2 = -1$, in conventional manner.

The corrected symbol is written:

$$C_{p,m,k} = s_p e^{-j(2\pi f_m(p-1)T_s + \phi_k)}$$

On the basis of the corrected symbol values for the packet, it is then possible to determine the likelihood of the correction $(f_m, \phi_k)$. In the simplest case, without channel encoding, it is possible to proceed as follows for the $N_c$ known symbols, and for the $N_i$ unknown symbols.

For the $N_c$ known transmitted symbols, written below $e_p$, $1 \leq p \leq N_c$, the quadratic error between the transmitted symbols and the phase-corrected symbols is calculated as follows:

$$\varepsilon_{m,k}^{\text{known symbols}} = \sum_{i=1}^{N_c} |C_{p,m,k} - e_p|^2$$

and corresponds to the Euclidian norm of the error vector between the transmitted symbols ($e_p$) and the phase-corrected symbols for the pair $(f_m, \phi_k)$ under test. Thus, for the known symbols and for the frequency offset and phase offset pair under test, a value is determined that is representative of the error in the received symbols, and thus of the likelihood of the pair under test.

In this implementation, for the $N_i$ unknown symbols, the invention proposes proceeding with a calculation of the same kind, but in which a firm decision is taken about the transmitted symbol as a function of the value of the corrected symbol $C_{p,m,k}$. For QPSK modulation, the firm decision is taken simply by considering the quadrant in the complex plane in which the corrected symbol is to be found. Typically:

for $0 \leq \arg(C_{p,m,k}) < \pi/2$, the decided symbol $D_{p,m,k}$ is $e^{j\pi/4}$;

for $\pi/2 \leq \arg(C_{p,m,k}) < \pi$, the decided symbol $D_{p,m,k}$ is $e^{j3\pi/4}$;

for $\pi \leq \arg(C_{p,m,k}) < 3\pi/2$, the decided symbol $D_{p,m,k}$ is $e^{j5\pi/4}$; and for $3\pi/2 \leq \arg(C_{p,m,k}) < 2\pi$, the decided symbol $D_{p,m,k}$ is $e^{j7\pi/4}$.

It is clear that this firm decision depends on the nature of the expected modulation, and needs to be adapted as a function of the symbols of the modulation. Thereafter, the quadratic error between the decided symbols and the phase-corrected symbols is calculated as follows:

$$\varepsilon_{m,k}^{\text{known symbols}} = \sum_{i=1}^{N_i} |C_{p,m,k} - D_{p,m,k}|^2$$

and corresponds to the Euclidian norm of the error vector between the phase-corrected symbols for the pair $(f_m, \phi_k)$ under test and the symbols that result from the firm decision. Thus, for the unknown symbols and for the frequency offset and phase offset pair under test, a value is determined that is representative of the error over the symbols received compared with the closest constellation of possible symbols. Again, this value is representative of the likelihood of the pair under test. Compared with the solution proposed for the known symbols, only a firm decision step has been added, and thereafter the same distance is used.

It can be seen that this likelihood calculation can be performed regardless of the number $N_c$ of known symbols in the packet. Again, the calculation described by way of example applies in the absence of any channel encoding. If the encoding of the channel used is known, then the firm decision step can be replaced by a step of decoding the code word formed by the unknown symbols, and calculating likelihood as the metric of the corrected symbols compared with the code word that results from decoding. Under such circumstances, it is also possible to proceed by decoding the entire packet, and calculating error or likelihood on a global basis, without separating known symbols and unknown symbols.

The invention proposes selecting as the frequency offset the value $f_m$ which corresponds to the most likely pair $(f_m, \phi_k)$. This determines a frequency offset, thereby making it possible to synchronize the packet.

In the implementation described, to calculate an error corresponding to a Euclidian distance and a selected symbol determined by a firm decision, the invention proposes simplifying the calculation. The symbol decided on by the firm decision is given by:

$$D_{p,m,k} = \text{sign}[Re(C_{p,m,k})] + j \times \text{sign}[Im(C_{p,m,k})]$$

where Re and Im are respectively the real and imaginary parts of the received symbol. Under such circumstances, the error $\epsilon_{p,m,k}$ is made up of three terms:

$$\varepsilon_{p,m,k} = |C_{p,m,k} - D_{p,m,k}|^2$$
$$= |C_{p,m,k}|^2 + |D_{p,m,k}|^2 - 2 \times Re(C_{p,m,k} \times D_{p,m,k})$$

The first term depends only on the received symbol and not on any guessed frequency-phase combination, so it need be calculated once only. The second term is constant and is equal to 2 when using MPSK modulation. The third term, or the selection of $D_{p,m,k}$ made by the firm decision is given by:

$$-2 \times Re(C_{p,m,k} \times D_{p,m,k}) = -2 \times [|Re(C_{p,m,k})| + |Im(C_{p,m,k})|]$$

which means that the calculation can be simplified. In addition, minimizing the error $\epsilon_{p,m,k}$ amounts to minimizing this third term, thereby considerably simplifying calculation.

For the known symbols, the transmitted symbols are of the form $e^{jn\pi/2}$, and error calculation can also be simplified. As a function of the value of the transmitted symbol, the calculations correspond to a combination of changing the sign of the real part and/or of the imaginary part, together, where appropriate, with a combination of the real part and of the imaginary part. As with the unknown symbols, it is possible to calculate the errors by a succession of simple operations on the real and imaginary parts of the received symbols.

Thus, in fact, the invention relies on calculations that are simpler than it would seem at first glance.

FIGS. 1 to 4 show comparative results obtained using the method of the invention and using known methods. In these figures, it is not absolute frequency offset or error δf which is shown, but normalized frequency error, which is the product of the frequency error δf multiplied by the symbol time $T_s$.

FIG. 1 is a histogram giving the results obtained by the Ryfe and Boorstyn estimator described in the above-mentioned article by Morelli, under the following conditions:

QPSK modulation;

N=450 symbols per packet;

$N_c$=16 known symbols per packet;

(Eb/No) transmitted=0.0 dB, i.e. Es/No=3.0 dB; and random normalized frequency offset over the range $-δfT_s$max to $+δfT_s$max, with $δfT_s$max=1.5×10$^{-3}$.

Residual frequency offset after the algorithm has been applied is plotted along the abscissa. This residual offset can be as great as $2δfT_s$max, assuming the frequency to be estimated is $-δfT_s$max and the estimated frequency is $+δfT_s$max. Probability is plotted up the ordinate. The results in FIG. 1 correspond to testing 90,000 packets. It can be seen that 150 packets had a residual normalized frequency error of 4.5×10$^{-4}$, which is starting to be rather large for a packet of about 500 symbols for subsequent demodulation or decoding, and regardless of the kind of decoding used.

Using the same conventions, and under the same conditions, FIG. 2 shows the results obtained by the invention, after receiving 90,000 packets. Along the abscissa, there are plotted only those residual normalized frequency offsets that lie in the range ±3.6×10$^{-4}$, given that the values obtained for all of the tested packets fell within that range. It can immediately be seen that the residual error is much smaller than that obtained in the prior art method; in addition, the residual error is small enough for subsequent decoding to be possible.

FIG. 3 shows results that are similar to those of FIG. 1, but for a value of Eb/No of 0.5 dB and for 100,000 tested packets. FIG. 4 shows the results of the invention, for the same value of signal-to-noise ratio, and after testing 700,000 packets. Again it can be seen that the invention makes it possible to provide results that are more accurate and more reliable.

These results can also be expressed in terms of cell loss rate (CLR). For calculation purposes, it was assumed that a packet is lost when the normalized frequency error exceeds 4.5×10$^{-4}$:

in the prior art:
CLR=1.6×10$^{-3}$ for 90,000 packets tested with Es/No=3.0 dB;
CLR=2.2×10$^{-4}$ for 100,000 packets tested with Es/No=3.5 dB;
CLR=6.0×10$^{-6}$ for 1,500,000 packets tested with Es/No=4.0 dB;

in the invention:
CLR zero for 90,000 packets tested with Es/No=3.0 dB;
CLR zero for 700,000 packets tested with Es/No=3.5 dB.

It can be seen that compared to the Ryfe and Boorstyn estimator described in the above-mentioned Morelli article, the invention makes it possible to obtain results that are more accurate; in addition, the limitation caused by "outlier" errors is avoided; the invention can thus be applied without concern for the threshold effect which can be a problem in the prior algorithm.

The invention thus applies to determining frequency offset for a phase-modulated signal packet. Various implementations of the method are described below enabling calculation to be simplified, and improving the performance of the estimator of the invention in terms of speed and ease of implementation.

In one implementation, the invention proposes testing phase over a small range only for the unknown symbols, and specifically over π/2 in the example of QPSK modulation. If a firm decision is taken, the symbol is selected as a function of quadrant in the complex plane, and calculated error is a function of period π/2; in other words, if the rectified symbol is rotated through nπ/2, then the phase of the decided symbol is rotated likewise and the quadratic error between the two of them does not change. It therefore suffices to test possible phase over a range [0, π/2] for QPSK modulation. For example, when MPSK modulation is used, where the symbols are written $e^{j2k\pi/m}$, it is possible in the same manner to test possible phase only over a range of [0, 2π/m]. More generally, if the constellation of symbols used for the modulation is invariant on rotation through 2π/z, where z is a natural integer greater than 1, then possible phases are tested only over a range of [0, 2π/z].

For the known symbols, and when using QPSK, phase is tested over the entire range of [0, 2π], given that the transmitted symbol must lie in that range.

In all cases, the range over which phase is tested depends on the periodicity of the error function calculated from the known or unknown symbols. Where appropriate, this periodicity also depends on how the received symbol is selected, for example with QPSK a firm decision leads to a periodicity of π/2.

With QPSK modulation, for example, it is possible to calculate separately error on the known symbols and error on the unknown symbols. Under such circumstances, an error value $\epsilon_{m,k}^{unknown\ symbols}$ for the unknown symbols and concerning a pair ($f_m$, $\phi_k$) could be used for calculating error over the entire packet for the following pairs:

($f_m$, $\phi_k$)
($f_m$, $\phi_k$+π/2)
($f_m$, $\phi_k$+π)
($f_m$, $\phi_k$+3π/2)

This avoids repeating several times over calculations that have identical results. For these four pairs it then suffices to calculate error over the known symbols and then to add in the error $\epsilon_{m,k}^{unknown\ symbols}$ over the unknown symbols.

In another implementation, the invention proposes limiting the value of the phase offset to be applied. For the $p^{th}$ symbols, the phase offsets to be applied have for their argument $-(2!\pi f_m(p-1)T_s+\phi_k)$ and are 2π-periodic. It is advantageous to calculate these phase offsets modulo 2π, returning them to a range [0, 2π], so as to limit the amplitude of the stored signals. This solution is particularly advantageous insofar as the arguments of the phase offsets to be applied can be calculated in advance and stored, as explained below. With QPSK modulation, the amplitudes of the stored signals can be further limited, as explained above; as a result, for the unknown symbols, it is possible to reduce the arguments of the phase offsets to be applied to the range [0, π/2]. In all cases, when implementing the invention, it is therefore not the arguments $-(2\pi f_m(p-1)T_s+\phi_k)$ that are used, but the reduced values of those arguments, e.g. over a range [0, 2π] for the known symbols and a range [0, 2π/k] for the unknown symbols when using kPSK modulation.

The invention also seeks to quantize the values of the arguments of the phase offsets to be applied for testing the various possible values of frequency offset and phase offset pairs. Thus, for an argument of $-(2\pi f_m(p-1)T_s+\phi_k)$ which is a function of symbol position, of frequency offset $f_m$, and of phase offset $\phi_k$, it is possible to select quantization, e.g. using a step size of $2\pi/k$ for integer k, and as a result to calculate only k possible values for the correction to be applied $e^{-j(2\pi f_m(p-1)T_s+\phi_k)}$. Under such circumstances, there is no need to perform calculations on each symbol and on each pair to be tested. Again, this quantization is particularly advantageous when the values of corrections to be applied to the received symbols are stored values. This form of implementation is advantageously combined with that described above, and the phase values are quantized only over the necessary range.

Thus, when testing over a frequency range (in terms of normalized frequency offset) extending from $[-1.5\times10^{-3}, +1.5\times10^{-3}]$, with a step size of $7.5\times10^{-6}$, and when testing phase over a range of $[0, 2\pi]$ with a step size of $\pi/(2\times15)$, it is necessary for each symbol of the packet to calculate $40\times60=2400$ corrected symbols.

By quantizing the arguments with a pitch of 20°, it is necessary to calculate only 180 arguments, i.e. 180 possible values for the correction or phase offset to be applied to a symbol, and 180 possible values for the corrected symbol. In addition, if the phase range is reduced because of the periodicity of the error, as explained above, then the number of corrections is reduced even further. With QPSK modulation and taking firm decisions, i.e. with a periodicity of $\pi/2$, it suffices for each symbol to circulate 45 possible values for the phase of the correction to be applied to the symbol, and thus to calculate for each received symbol only 45 corrected symbols.

Again, this solution is particularly advantageous if it is decided to calculate all possible corrections in advance and to store them, as described above. Quantization does not reduce the accuracy with which frequency is determined by the invention. A quantization step size for the arguments of 2° leads to a maximum argument error of 1°; the influence of quantization on the results obtained is small: by quantizing frequency values on 10 bits, no deterioration in performance is observed.

One possible architecture for implementing the invention is described below. In this architecture, it is preferred to recalculate the various error values; this implementation can turn out to be simpler in certain application-specific integrated circuits (ASICs) where memory capacity is limited. FIG. 5 is a block diagram of this architecture. In the apparatus of FIG. 5, $n_{100}$ is taken as being equal to 16, and frequencies are tested in the range -fmax to +fmax. This architecture relies on a basic block which processes a packet for $n_\phi=16$ phase guesses and two frequency guesses. The basic block is used $n_\phi/2$ times per packet.

The first block 1 represents receiving the symbols $s_p$ of the packet, which symbols are processed in complex form, having a real part $X_p$ and an imaginary part $Y_p$.

The second block 2 represents transformation into polar coordinates $(\rho_p, \theta_p)$.

The third block 3 represents the received symbols being stored in polar coordinates.

The fourth block 4 is the basic block which tests two frequencies $f_p$ and $-f_p$ for the 16 possible phase values. The block receives the symbols $s_p$ in polar coordinates from the third block 3, and from a fifth block 5 it receives possible frequency values $f_p$ where p is an integer lying in the range 1 to $n_f/2$. At its output, the block 4 delivers a minimum frequency and phase value and a corresponding error for the two frequencies and the 16 phases being processed. These values are stored in a sixth block 6.

When a possible frequency value $f_p$ is tested in the block 4, the selected frequency value $\pm f_p$ is stored in the fifth block, together with the corresponding phase $\phi_k$ and the error $\epsilon_{m,k}$ over the packet. When testing the following frequency, the values are replaced if the new error is smaller. After scanning through all possible frequency values, the sixth block contains the most likely guesses for frequency and for phase.

Then, as represented by the seventh block 7, the stored symbols are corrected so that the eighth block 8 has delivered thereto the corrected symbols $s'_p=(X'_p, Y'_p)$ which can then be used for channel decoding, if any.

FIG. 6 shows an embodiment of the basic block 4 as shown in FIG. 5, for processing a symbol of order k. 10, 11, and 12 represent the inputs for $\rho k$, $\theta k$, and $f_p$. The frequency $f_p$ is initially multiplied by $\pm(k-1)T_s$ as represented by blocks 14 and 15. The two resulting values are added to the 16 possible phase values $\phi_1$ to $\phi_{16}$, $n_\phi=16$, as represented by blocks 16 and 17. This provides $2\times16$ possible arguments for phase correction. These arguments are subtracted from the argument $\theta_k$ of the symbol as represented by blocks 18 and 19.

The following function $F(\theta)$ is calculated:

$$F(\theta_k) = \frac{[|\text{Re}(C_{p,m,k})| + |\text{Im}(C_{p,m,k})|]}{\rho_k} = |\cos\theta_k| + |\sin\theta_k|$$

This quantity is multiplied by $\rho_k$ as represented by blocks 20 and 21. As explained above, minimizing the error $\epsilon_{p,m,k}$ amounts to minimizing $-2\times\rho_k\times F(\theta)$, i.e. in maximizing $\rho!_k\times F(\theta)$. This quantity calculated for the symbol of order k is added to the sum of the $\rho_k\times F(\theta)$ for the k-1 preceding symbols, as represented by blocks 22 and 23.

After all of the symbols have been received, a quantity will thus have been calculated whose maximization is equivalent to minimizing the error $\epsilon_{m,k}$.

For a given frequency value $f_p$, it is possible to calculate the value $\pm f_p$ and the phase $\phi_k$ that maximizes:

$$\sum_{k=1}^{N} \rho_k F(\theta)$$

as represented by clock 25, and the pair that has been retained and the corresponding error value can be output.

The architecture of FIGS. 5 and 6 can be implemented, for example, in an ASIC type printed circuit making it possible to process packets of 400 or 500 symbols with a symbol time of microsecond order. Total processing for 40 frequency guesses and 16 phase guesses can be performed in a length of time that is shorter than the duration of a packet.

Another possible architecture for implementing the invention is described below. In this architecture, particular use is made of memories. The invention thus proposes in this case to calculate initially, once and forever, the various phase correction values for corrected symbols. This solution is particularly advantageous when the arguments of the possible phase corrections are quantized, and the description applies to this case.

The phase correction $e^{-j(2\pi f_m(p-1)T_s+\phi_k)}$ does not depend on the value of the symbol $s_p$ as received, but only on the position of the symbol, and on the frequency offset and phase offset pair $(f_m, \phi_k)$ under test. It is thus possible for all triplets (p, m, k) to calculate all possible offset values. When quantization is used, it is possible to begin by calculating the quantized values of the phase corrections, 180 possible values per known symbol in the example described above.

Once a table of possible values has been built, it is easy when receiving a new packet to take the phase offset values that are to be applied from the table. With QPSK, the number of possible values is $t_\phi=45$ for the unknown symbols and $4t_\phi=180$ for the known symbols, when arguments are quantized at a pitch of 2°. By numbering the quantized phases to be tested in increasing order, phase $\phi_l$ of order l is given by:

$$\phi_l = \frac{l}{t_\phi} \times \frac{\pi}{2}$$

For an unknown symbol, phases are tested from l=0 to l=$t_\phi$, and the maximum phase is $\pi/2$. For a known symbol, phases are tested from l=0 to l=$4t_\phi$, and the maximum phase is $2\pi$. The order numbers of the phases for each of the pairs ($f_m$, $\phi_k$) can then be stored in a table Tmem for each of the symbols of the packet. A table is thus obtained having $N \times n_f \times n_\phi$ integer values.

On receiving a packet, the possible values for the corrected symbols are calculated initially. For the unknown symbols, a table $T_i$ is filled with $N_i \times t_\phi$ possible values for corrected symbols. For the known symbols, a table $T_c$ is filled with $N_c \times 4t_\phi$ possible values of corrected symbols.

Errors can be then be calculated for any given pair ($f_m$, $\phi_k$) by reading in the table Tmem the row of the table that corresponds to the pair ($f_m$, $\phi_k$); to obtain the value of the $p^{th}$ corrected symbol, its suffices;

to take the information from the $p_{th}$ column of the table Tmem, i.e. the number of the quantized phase offset argument to be applied; and to look up in table $T_i$ or $T_c$, depending on whether the symbol is unknown or known, at the cross-point between the row corresponding to the order number of the phase read from the table Tmem and the column corresponding to the order number p of the symbol.

It is also possible, on starting, to calculate and store errors in the tables $T_i$ and $T_c$. This has the advantage of storing values that are real and not complex. As mentioned above, it is also possible to perform calculations for any given phase $\phi_k$, on the known symbols and then to calculate the corresponding error on the unknown symbols, and to store said error for calculating error over the packet for the phases $\phi_k + n\pi/2$, for n=0, 1, 2, or 3.

This implementation makes it possible to limit the amount of calculation performed, given that the corrected symbol values are calculated once only. It is particularly advantageous when a large amount of memory capacity is available.

In the embodiments described above, phase estimation is not described in detail. Together with an estimated value for the frequency offset, the invention also provides a phase value $\phi_r$; if the packet has unknown symbols only, then for QPSK modulation, this phase value has ambiguity of $n\pi/2$ for integer n, because the symbols are invariant under this modulation by rotation through $n\pi/2$. This ambiguity can be lifted if the packet has known symbols. For certain kinds of channel encoding, and for differential encoding, phase ambiguity is not a problem and does not need to be lifted. The invention also makes it possible to obtain accuracy concerning phase that is greater than that of the prior art.

The invention is described above with reference to QPSK modulation. It applies more generally to all kinds of phase modulation or to all kinds of phase-and-amplitude modulation. In particular, mention can be made of MPSK modulation and of QAM modulation. The invention can be applied not only when there is no channel encoding, as in the embodiment described above, but also when there is channel encoding of any kind. When block codes are used, it is possible to calculate maximum likelihood by the metric relative to the closest code word.

Furthermore, when certain codes are used, phase ambiguity need not be a difficulty. Under such circumstances, the invention makes it possible to determine frequency differences, and that is sufficient for decoding purposes.

The guesses as to frequency and phase $f_m$ and $\phi_k$ that are used for implementing the invention depend on the application of the invention. Similarly the selected frequency pitch and the phase pitch depend on the application. Selection is performed as a function of the accuracy required and of the amount of calculation that is acceptable.

What is claimed is:

1. A method of estimating the frequency offset of a packet of phase modulated symbols received with phase error, the method comprising:

applying a phase correction to the symbols of the received packet for all possible pairs of frequency offset and phase offset; and selecting from said offset pairs, the pair which provides the most likely packet of corrected symbols, thereby determining the frequency offset of the received packet.

2. A method according to claim 1, further including a step of quantizing possible phase corrections.

3. A method according to claim 1, wherein the selection step comprises:

calculating a metric between the packet of symbols as received and phase-corrected and an estimate of the packet of symbols as sent; and seeking a minimum value of said metric.

4. A method according to claim 3, wherein the estimate of the packet of symbols transmitted is obtained:

for known symbols, by using the transmitted symbol; and for unknown symbols, by taking a firm decision.

5. A method according to claim 1, wherein rotation through $e^{j2\pi/k}$, where k is a natural integer, leaves the set of possible symbols invariant, and wherein possible phase values are selected from a range of [0, $2\pi/k$].

6. A method according to claim 1, wherein the phase correction applied to the symbols, for a frequency offset value $f_m$ and for a phase offset value $\phi_k$ is written $e^{-j(2\pi f_m (p-1)T_s + \phi_k)}$, where p is the position of the symbol and $T_s$ is the symbol time.

7. A method according to claim 6, wherein the values of the argument $-(2\pi f_m(p-1)T_s + \phi_k)$ are calculated in the form of reduced values, e.g. over a range [0, $2\pi$].

8. A method according to claim 1, comprising a prior step of calculating and storing all possible phase corrections to be applied to a symbol.

9. A method according to claim 1, including a step of estimating the phase offset as being the phase offset value in said pair that provides the most likely packet of corrected symbols.

10. The method according to claim 1, wherein the phase correction is applied for only pairs of frequency offset and phase off-set.

* * * * *